W. McA. JOHNSON.
METALLURGICAL CONDENSER.
APPLICATION FILED NOV. 30, 1903.
933,843.
Patented Sept. 14, 1909.
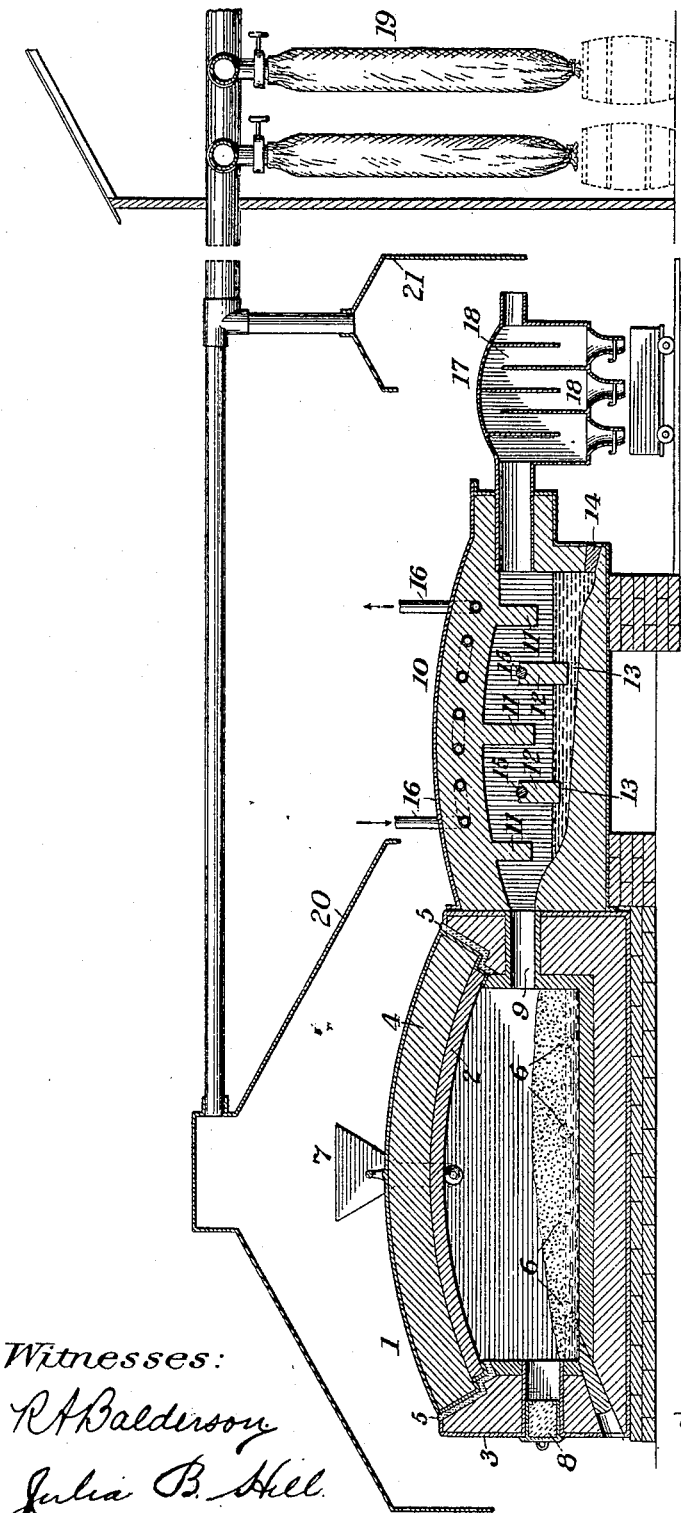
Witnesses:
R. A. Balderson
Julia B. Hill
Inventor:
Woolsey McA. Johnson
by
Byrnes & Townsend,
Att'ys.

UNITED STATES PATENT OFFICE.

WOOLSEY McA. JOHNSON, OF LA HARPE, KANSAS, ASSIGNOR TO THE CONTINUOUS ZINC FURNACE COMPANY, OF HARTFORD, CONNECTICUT, A CORPORATION OF CONNECTICUT.

METALLURGICAL CONDENSER.

933,843.  Specification of Letters Patent.  Patented Sept. 14, 1909.

Application filed November 30, 1903. Serial No. 183,275.

*To all whom it may concern:*

Be it known that I, WOOLSEY McA. JOHNSON, a citizen of the United States, residing at La Harpe, in the county of Allen and State of Kansas, have invented certain new and useful Improvements in Metallurgical Condensers, of which the following is a specification.

This invention is a condenser or condensing system for volatile elements, such as zinc, and comprises a condensing chamber provided with means for regulating and controlling its temperature.

The invention also comprises supplemental means for the collection of the volatile product, as hereinafter described.

For a full understanding of my invention reference is made to the accompanying drawing, wherein the figure is a central, vertical section of one form of smelting furnace, with my condenser and collecting system in operative relation therewith. In said drawing I have shown an electric furnace of the type described and claimed in my copending application Serial No. 183,276, filed November 30, 1903, but it will be understood that my condensing system may be employed with any suitable smelting furnace.

Referring to the figure, 1 represents the body of the furnace, which may consist of fire-brick and for the smelting of oxidized zinc ores is preferably provided with a suitable basic lining 2. The furnace is preferably incased in a sheet-metal shell 3. The cover 4, which may extend over a portion or all of the furnace, is preferably formed as a refractory arch, and is bedded in fire-clay, as shown at 5.

6, 6 are electrodes arranged in opposing pairs and movable in the furnace walls, as is well understood.

7 represents means for introducing the charge upon and over the portions of the electrodes which project into the furnace chamber, and 8 indicates rabbling doors, of which any desired number may be provided.

In practice the charge is preferably so distributed over the hearth of the furnace and between the electrodes that the cross sectional area of the same increases toward the outlet for the metal vapors: thus I have indicated such distribution of the charge that the greatest resistance is offered to the current by that portion of the charge farthest removed from the vapor outlet 9, whereby the vapors of the metal are given a positive movement through the furnace and toward the collecting devices, as more fully set forth in my application Serial No. 176,856, filed October 13, 1903.

10 represents a condenser for the metallic vapor. This condenser is preferably constructed of or lined with refractory materials, and is preferably sheathed with sheet-metal, as shown. It is so constructed as to provide a tortuous path for the vapors, whereby its efficacy as a condenser is greatly increased. Thus I have illustrated it as provided with depending partial partitions or baffle walls 11, 11 and with upwardly extending partial partitions or baffle walls 12, 12 alternating with the former, whereby a tortuous passage is provided between the inlet and outlet. The walls 12, 12 are provided with openings 13, 13 and the base of the condenser is preferably inclined, as shown, toward the tap-hole 14, for the metal which may be delivered into any suitable mechanical casting apparatus.

It is well known that for the condensation of the vapors of zinc and their recovery in the form of spelter, it is essential that the temperature of the condensing chamber be maintained between definite limits, say between 415° and 550° C. If the temperature of the condenser be too high the vapors of the metal will escape condensation, while if the temperature be too low said vapors will be deposited in the form of fume, and will require further treatment and be subjected to further loss in being brought into commercially available form. In order to maintain at all times a proper degree of temperature within the condenser I provide the same with both heating and cooling means, by the use of which an accurate adjustment of temperature can be made.

My heating means consists preferably of resistance conductors 15, 15, which may be located in any desired position within the condensing chamber or in the walls thereof, but which are preferably of carbon and which may be conveniently supported, as shown, in or upon some or all of the partitions 11, 12. I prefer to arrange such carbon heaters in such manner as to expose carbon surfaces to the vapors, whereby the complete reduction of said vapors is assured.

My cooling means is shown as comprising conduits 16 for air, water, or other cooling medium, within the roof of the condenser.

It will be understood that considerable heat is evolved during the condensation of the zinc, and that a condenser such as is here described, having a large condensing capacity, may become highly heated by reason thereof. Thus it may be desired to apply heat to the condenser during the early stages of the operation, and at later stages to cool the condenser to withdraw the excess of heat due to the condensation and to the passage of the highly heated furnace gases and metallic vapors. It may be desirable to apply heat to the condenser during any stage of the operation when the evolution of zinc is relatively slow. By providing both heating and cooling means I am enabled to properly regulate the temperature of the condenser, whatever be its capacity or that of the furnace with which it is connected, or whatever be the rate at which zinc is being condensed.

In addition to the condenser or condensers I preferably provide a collector 17 for any zinc fumes which may escape from the condenser 10. The collector may be made of sheet-metal and is preferably also constructed to afford a tortuous path 18, 18 for the gases carrying the solid matter in suspension, suitable discharge devices being provided for the product. I prefer also to provide over the furnace a collecting hood 20 which is connected by a conduit with the usual fan and bags, and which serves to collect and transport to the bag-house 19 any zinc oxid which may escape from the furnace during the rabbling, or from the apertures around the electrodes, or elsewhere. A similar collecting hood 21 is conveniently arranged in proximity to the outlet of the fume collector 17.

I have described the electric heater in my condenser as consisting of a conductor or conductors of high resistance. It will be understood that the heater may take the form of an arc between carbon terminals, and I preferably so locate the heater, whether incandescent or arc, that the heat therefrom will be reflected by the reverberatory arch of the furnace.

I claim:—

1. In combination, a zinc furnace or retort and a condenser in operative relation therewith, said condenser being provided with cooling means, and with electrical heating means consisting of exposed or partially exposed bodies of carbon, substantially as described.

2. A metallurgical condenser having baffle walls and electrical heating means carried thereby, substantially as described.

3. A metallurgical condenser having baffle walls and carbon resistances carried thereby, substantially as described.

4. A zinc condenser provided with cooling means and independent heating means, substantially as described.

5. A zinc condenser provided with cooling means and with electrical heating means, substantially as described.

6. A metallurgical condenser having an inlet and an outlet, upper and lower baffle walls arranged to provide a tortuous passage between said inlet and outlet, openings through said lower baffle walls, heating means supported by said baffle walls and a tap-hole for the condensed metal, substantially as decribed.

7. A zinc condenser provided with cooling means applied to the walls and with heating means within the condensing chamber, substantially as described.

In testimony whereof I affix my signature in presence of two witnesses.

WOOLSEY McA. JOHNSON.

Witnesses:
A. M. EWING,
ARTHUR W. COX.